Oct. 4, 1932.   F. W. BLANCHARD   1,880,721
CLUTCH CONTROL MECHANISM
Filed April 5, 1930   2 Sheets-Sheet 2
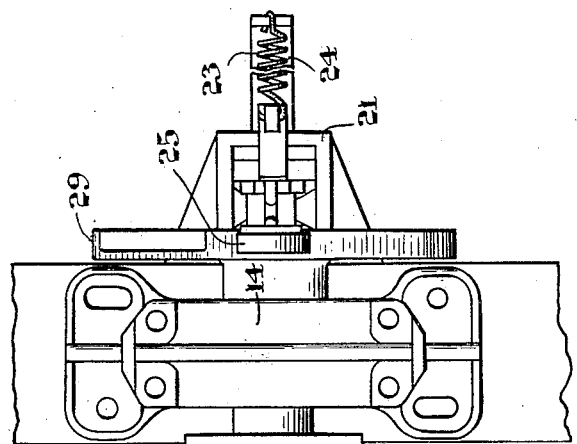
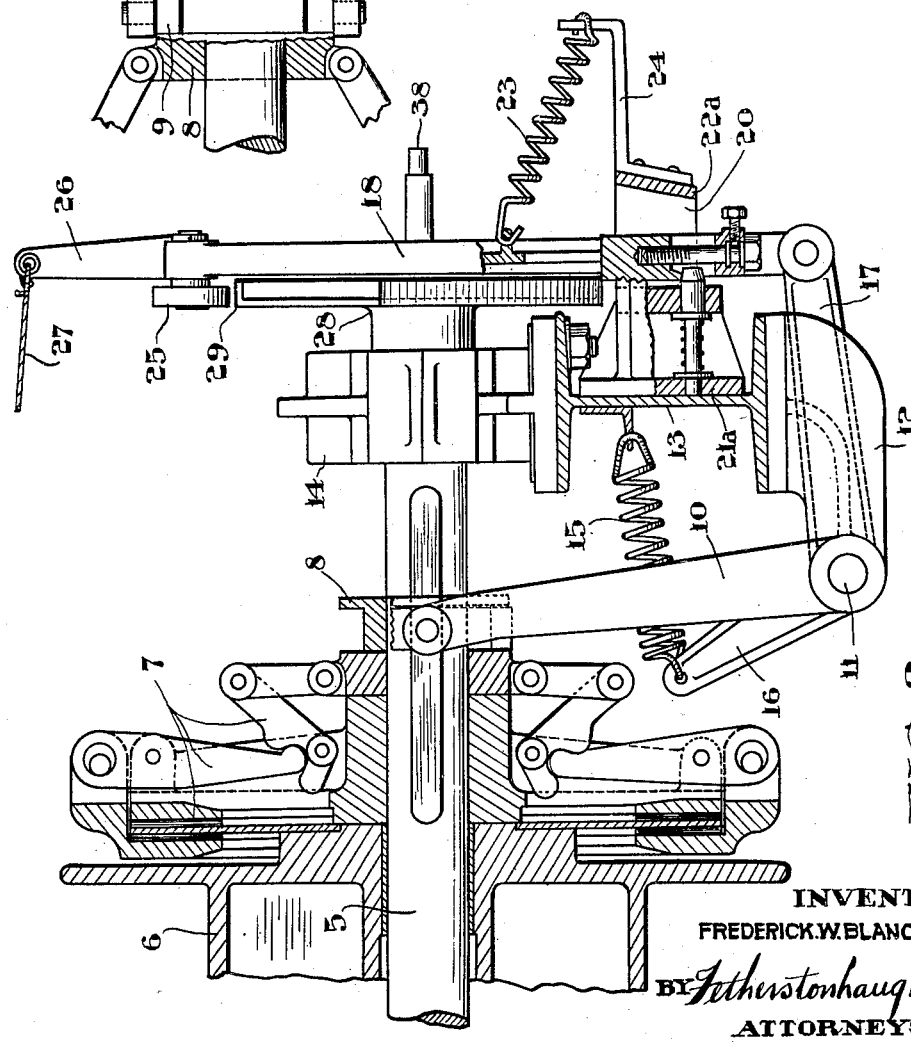
INVENTOR
FREDERICK W. BLANCHARD
BY Fetherstonhaugh & Co.
ATTORNEYS Patented Oct. 4, 1932

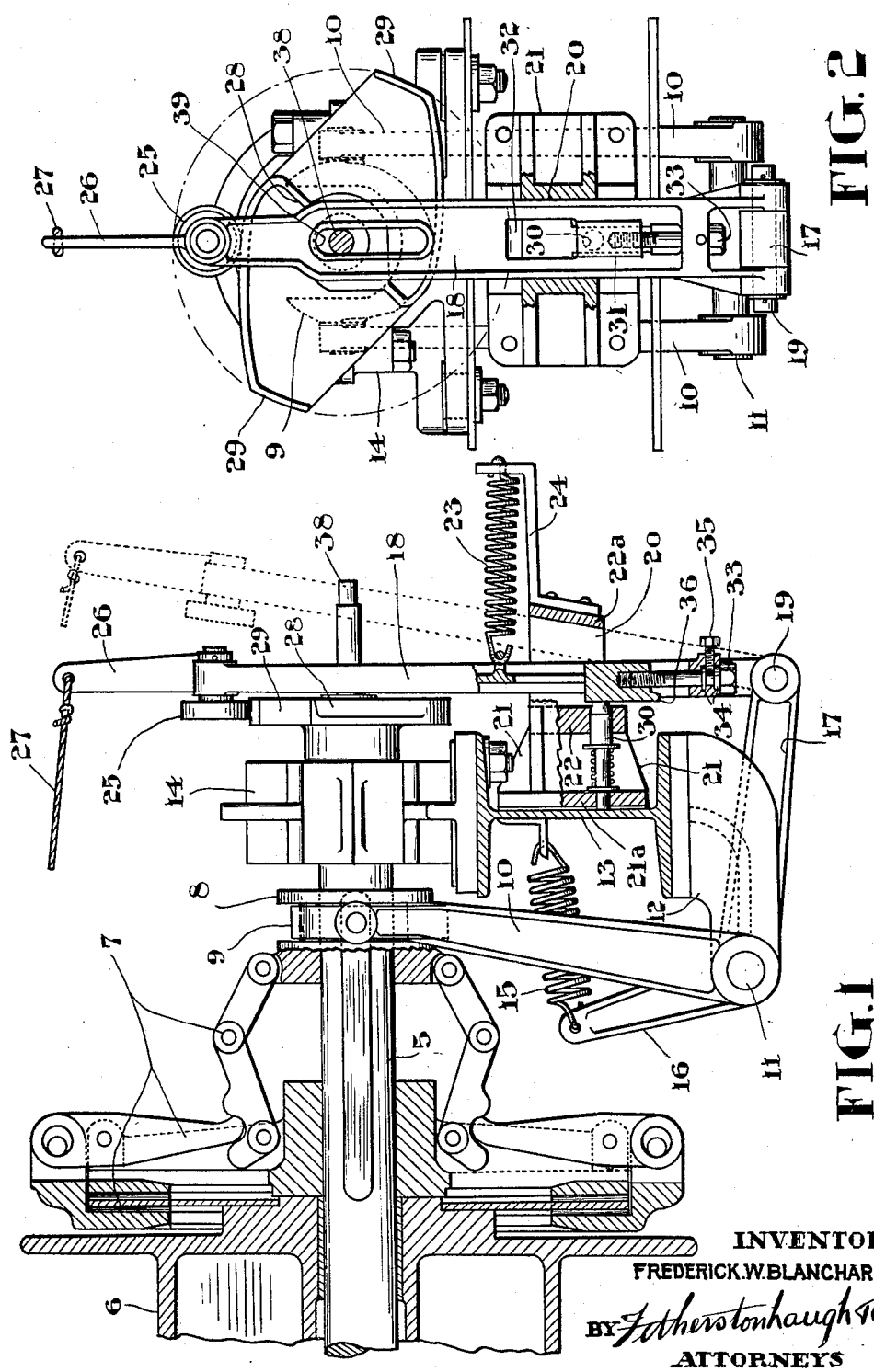

1,880,721

UNITED STATES PATENT OFFICE

FREDERICK W. BLANCHARD, OF MONTREAL, QUEBEC, CANADA, ASSIGNOR TO JOHN S. METCALF COMPANY LIMITED, OF MONTREAL, CANADA

CLUTCH CONTROL MECHANISM

Application filed April 5, 1930. Serial No. 441,992.

This invention relates to clutch control mechanisms, and particularly to the control of relatively large and heavy power operated clutches.

The purpose of the invention is to provide means permitting an operator at a remote point to control the functioning of such clutches with a minimum expenditure of effort.

According to this invention, easily actuated means, controllable from a remote point, are provided for positioning a clutch shifting element in co-operative relation with a cam or an equivalent power driven device, which thereafter furnishes the power required to actuate the clutch. While this invention may be applied to various types of clutches, the present description will be confined to a specific example, wherein the clutch shifting element is part of a clutch connection provided between a power shaft and a driven element such as a drum loosely mounted on the shaft. In this arrangement, the cam or its equivalent is usually fixed to or actuated by the drum carrying shaft.

Proceeding now to a more detailed discussion of the invention, reference will be had to the accompanying drawings, wherein Figure 1 is a fragmentary view, partly in section and partly in elevation, showing the invention applied to the control of a clutch connection provided between a power shaft and a drum loosely mounted thereon.

Figure 2 is an end elevation of part of the assembly shown in Figure 1, the drum and certain other elements being omitted for the sake of clearness.

Figure 3 is a view similar to Figure 1, but showing the parts in a different relative position.

Figure 4 is a fragmentary top plan view of part of the assembly shown in Figures 1 and 2.

In these drawings, 5 designates a continuously rotating power shaft having a drum 6 loosely mounted thereon. When the drum is to be driven by the shaft it is connected therewith by a standard friction clutch generally indicated at 7. Engagement and disengagement of the clutch 7 is controlled by movement of a collar 8 lengthwise of the shaft 5. This is accomplished by a yoke 9 engaging the collar 8 and carried by a pair of arms 10. These arms 10 are carried by a rock shaft 11 journalled in bearing brackets 12 carried by a frame member 13 which also carries the bearing 14 of shaft 5. The clutch 7 is normally held disengaged by a spring connection 15 provided between the frame member 13 and a lever 16 rigid with the rock shaft 11.

The rock shaft 11 is equipped with a sectional lever device including a substantially horizontal lever section 17 and a substantially vertical lever section 18. Lever section 17 has one end rigid with shaft 11 and the other end pivoted to the lower extremity of lever section 18. Lever section 18 is vertically movable and is also capable of independent swinging movement about the pivot 19. Said lever section 18 passes upwardly through an opening 20 formed in a bracket 21 fixed to the frame member 13. This opening is made large enough to permit lever section 18 to have a limited lateral movement between the walls 22 and 22a. Wall 22a is slightly inclined in order to flatly engage the lever section 18 when the latter is at the limit of its outwardly swinging position. Lever section 18 is normally held in its outwardly swung position by a spring 23 having one end fastened to said lever section and the other end fastened to a bar 24 carried by the wall 22a. Lever section 18 is provided at its upper end with a roller 25 and an extension 26. A rope 27 connected to the extension 26 extends to any suitable point of remote control. When it is desired to engage the clutch 7, a pull is exerted on rope 27 to swing the lever section 18 from the dotted to the full line position shown in Figure 1. This positions the roller 25 in the path of a cam 28 fixed to shaft 5. The roller is thereupon engaged by one of the cam lifts 29 so that the lever section 18 is moved in an upward direction and acts, through the lever section 17, rock shaft 11 and arms 10, to engage the clutch 7.

When the lever section 18 reaches the uppermost position to which it is moved by the cam lift 29 and roller 25, it is held in this position by a plunger 30. This plunger is slidably supported by the base plate 21a and wall 22 of bracket 21 and is normally held in retracted position by engagement with an adjustable block 31. The block 31 is adjustable in a guideway or slot 32 formed in the lever section 18. The block is adjustable in the slot or guideway 32 by reason of its threaded engagement with an adjusting screw 33. This screw is formed with a grooved collar 34 which is rotatably held in a suitable socket in the lever section 18 by means of a set screw 35. As the lever section 18 reaches its uppermost position, the bolt 30 is permitted to project beneath the block 31 and into supporting engagement with a shoulder 36 formed at the lower end of the block. In this manner, the lever section 18, after being raised to a clutch engaging position, is retained in such position by the plunger 30, as long as sufficient pull is maintained on the rope 27 to keep the shoulder 36 engaged with said plunger.

When it is desired to disengage the clutch, the pull on the rope 27 is released. This permits spring 23 to swing the lever section 18 to the dotted line position shown in Figure 1, thereby disengaging the shoulder 36 from the plunger 30 and permitting the spring 15 to return the parts to normal position, in the course of which the shaft 11 is rotated in a clutch disengaging direction.

The shaft 5 may be provided with a guide pin 38 operating in a vertical slot 39 formed in the lever section 18.

Having thus fully described what I now consider to be the preferred embodiment of my invention, it will be understood that various modifications may be resorted to within the spirit and scope of the appended claims.

Having thus described my invention what I claim is:—

1. A clutch control mechanism including a clutch shifter having a movable part, a power driven cam, manually controlled means for shifting said movable part to a cam engaging position whereby said clutch shifter is automatically operated to a clutch engaging position, means co-operating with said movable part to retain the clutch in engaged position, said means being releasable by releasement of said manually controlled means.

2. A clutch control mechanism as recited in claim 1 including means co-operating with the clutch shifter to disengage the clutch upon releasement of said manually controlled means.

3. The combination of a shaft, an element mounted thereon, a clutch for establishing and disrupting a drive connection between said shaft and said element, a cam fixed to said shaft, a clutch shifter comprising a rock shaft operatively connected to said clutch, a lever comprising a pair of pivotally connected sections, one of said sections constituting an arm rigid with the rock shaft and the other section being provided with a cam engaging roller and means for operating the last mentioned section of the lever to move the roller into and out of the path of the cam carried by said shaft, and latch means arranged to releasably secure said last mentioned section of the lever in a clutch engaging position to which the said section is moved during the period that the cam engaging roller is engaged with said cam.

4. The combination of a shaft, an element mounted thereon, a clutch for establishing and disrupting a drive connection between the shaft and said element, a rock shaft equipped with clutch shifting arms connected to the movable element of the clutch, a spring normally holding the rock shaft in a clutch disengaging position, a cam fixed to said first mentioned shaft, a lever including a pair of pivotally connected sections, one of said sections constituting an arm rigid with the rock shaft and the other section being pivoted to the free end of the first mentioned section and equipped with a cam engaging roller, means for swinging the last mentioned section of the lever in opposite directions to shift the roller into or out of the path of the cam, said last mentioned section of the lever being provided with a socket and a spring pressed latch member adapted to engage in said socket to retain said section in a clutch engaging position to which it is moved by the cam and the cam engaging roller.

In witness whereof I have hereunto set my hand.

FREDERICK W. BLANCHARD.